United States Patent
Hendrickson et al.

(10) Patent No.: US 7,237,679 B1
(45) Date of Patent: Jul. 3, 2007

(54) PROCESS FOR SIZING PARTICLES AND PRODUCING PARTICLES SEPARATED INTO SIZE DISTRIBUTIONS

(75) Inventors: William A. Hendrickson, Stillwater, MN (US); John Anderson, Fredricksburg, IA (US); Monica A. Hamer, Woodbury, MN (US); Peter Lentz, Hudson, WI (US); Joe Rechtiene, River Falls, WI (US)

(73) Assignee: Aveka, Inc., Woodbury, MN (US)

( * ) Notice: Subject to any disclaimer, the term of this patent is extended or adjusted under 35 U.S.C. 154(b) by 518 days.

(21) Appl. No.: 09/945,889

(22) Filed: Sep. 4, 2001

(51) Int. Cl.
*B07C 5/00* (2006.01)
(52) U.S. Cl. ..................... 209/638
(58) Field of Classification Search ........ 209/642, 209/644, 638, 932
See application file for complete search history.

(56) References Cited

U.S. PATENT DOCUMENTS

| | | | |
|---|---|---|---|
| 1,008,204 A * | 11/1911 | Seghers | 65/19 |
| 2,255,206 A * | 9/1941 | Duncan | 209/142 |
| 3,738,483 A * | 6/1973 | MacKenzie | 209/44.1 |
| 3,945,915 A * | 3/1976 | Wilson | 209/44.1 |
| 4,002,706 A | 1/1977 | Pretorius | |
| 4,031,174 A | 6/1977 | Bennett | |
| 4,277,273 A * | 7/1981 | Legille et al. | 209/138 |
| 4,288,317 A * | 9/1981 | de Ruvo et al. | 209/139.2 |
| 4,424,072 A | 1/1984 | Lerner | |
| 4,587,358 A | 5/1986 | Blouin | |
| 4,675,140 A | 6/1987 | Sparks et al. | |
| 4,793,783 A | 12/1988 | Huey et al. | |
| 4,801,411 A * | 1/1989 | Wellinghoff et al. | 264/7 |
| 4,834,870 A * | 5/1989 | Osterberg et al. | 209/38 |
| 4,885,021 A | 12/1989 | Elrod | |
| 4,935,173 A | 6/1990 | Huey et al. | |
| 5,011,285 A | 4/1991 | Jorgensen et al. | |
| 5,045,176 A * | 9/1991 | Walters et al. | 208/113 |
| 5,492,701 A | 2/1996 | Cervos et al. | |
| 5,628,937 A | 5/1997 | Oliver et al. | |
| 5,693,342 A | 12/1997 | Cervos et al. | |
| 5,766,521 A | 6/1998 | Le Thiesse et al. | |
| 5,782,951 A | 7/1998 | Aylen et al. | |
| 5,897,876 A | 4/1999 | Rudnic et al. | |
| 5,910,558 A | 6/1999 | Schoenherr et al. | |
| 6,444,000 B1 * | 9/2002 | Firey | 44/639 |
| 6,461,403 B1 * | 10/2002 | Olsen | 75/335 |

FOREIGN PATENT DOCUMENTS

| | | |
|---|---|---|
| EP | 0 086 704 | 8/1983 |
| GB | 1454597 | 11/1976 |

* cited by examiner

*Primary Examiner*—Joseph Rodriguez
(74) *Attorney, Agent, or Firm*—Mark A. Litman & Associates, P.A.

(57) ABSTRACT

A process for separating particles of different sizes comprising projecting a stream of particles into a fluid medium; allowing the particles to develop differing trajectories in the fluid medium; providing at least two separate collection areas for different average size particles from the stream of particles; and collecting particles along said different trajectories.

10 Claims, 2 Drawing Sheets

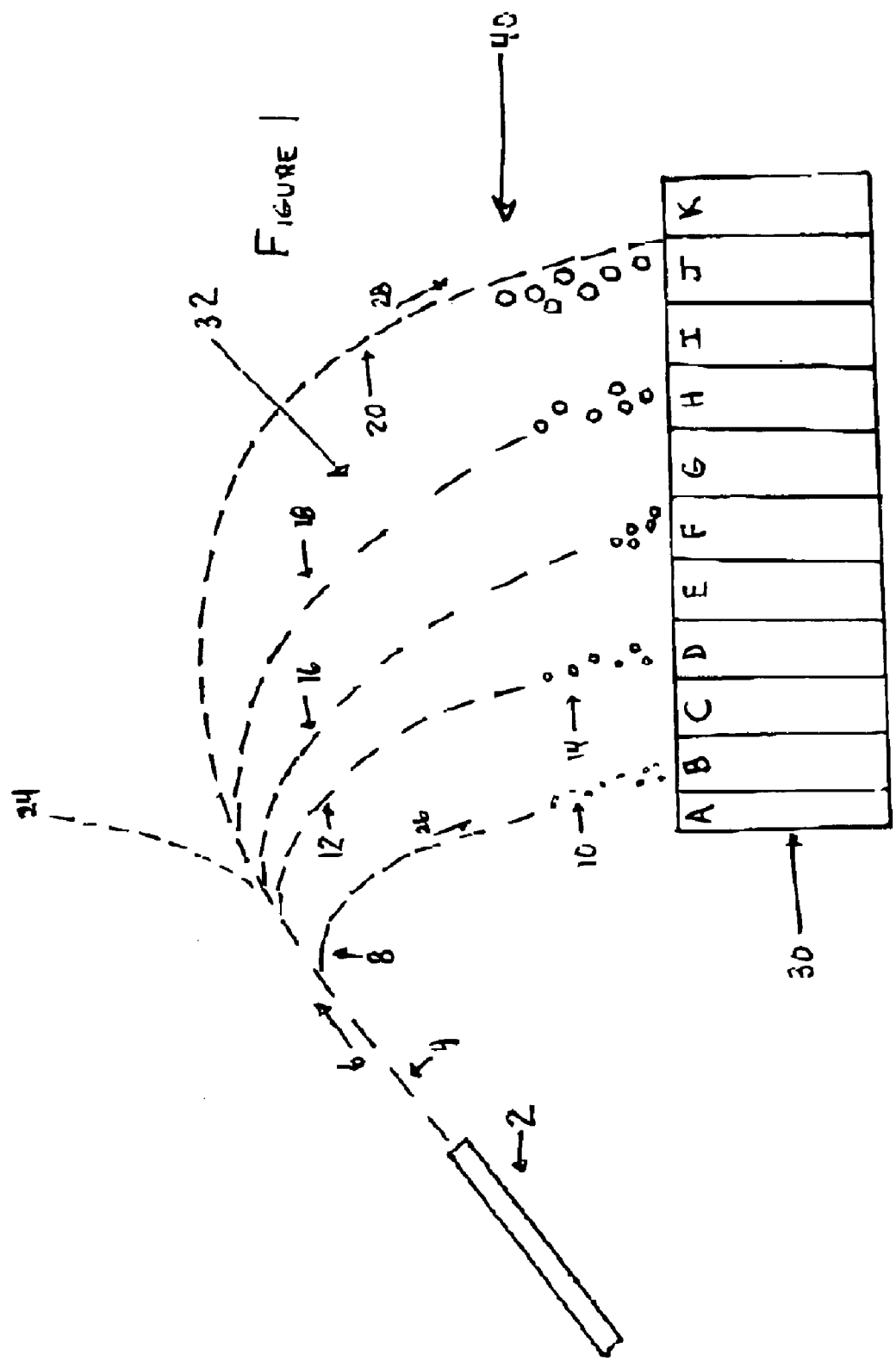

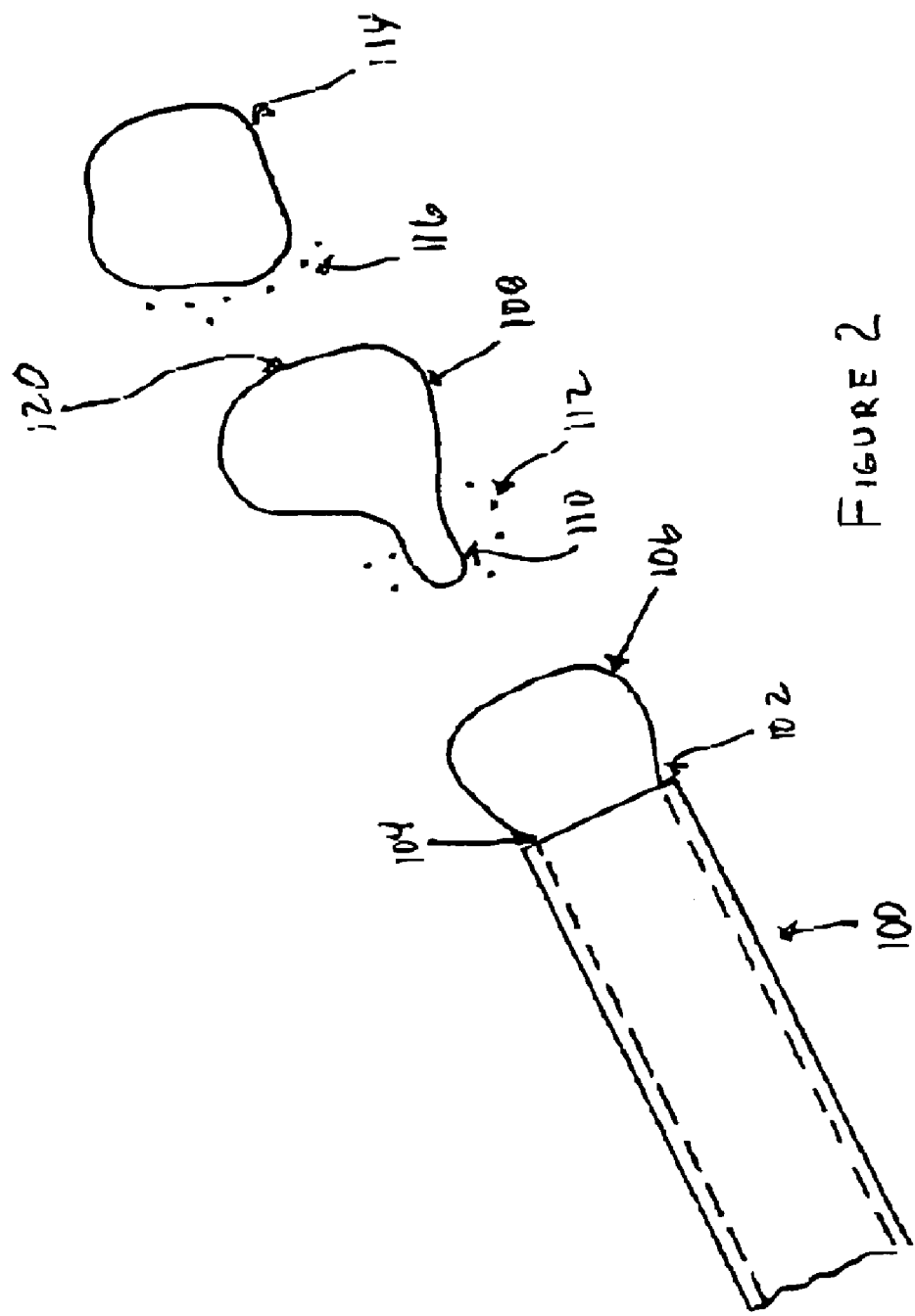

PROCESS FOR SIZING PARTICLES AND PRODUCING PARTICLES SEPARATED INTO SIZE DISTRIBUTIONS

BACKGROUND OF THE INVENTION

1. Field of the Invention

The present invention relates to the characterization of particles by sizes, the sizing of particles during manufacturing, and the separation of particles into segments of uniform particle size distributions. In particular, the invention relates to particle manufacture and to the sizing of particles, especially those particles that are formed from molten or rapidly solidified compositions.

2. Background of the Art

It is desirable for a number of industrial and commercial applications to produce particulate materials with a narrow size (e.g., a standard deviation of less than 25%, less than 15%, less than 12%, less than 10%, less than 8% or less than 5% variation of particles from the number average diameter) distribution range. Particles are used in a wide range of products in a wide range of fields where the size and size distribution of the particles have direct effects upon performance of the final product. Such fields, for example, including pharmaceuticals, photographic emulsions, abrasives, exfoliants, propellants (e.g., the propelled material), dietary supplements, skin treatments, cosmetics, filtering media, food additives, applied powders, chemical processes, physical process (e.g., mixing) and the like.

Particles may be formed by many different types of processes, depending upon the nature of the composition of the particles and the manufacturing method for the particles. Particles may be created directly by the synthetic process (as by emulsion polymerization, precipitation methods, crystallization methods, phase reactions, etc.) or they may be formed by processing techniques that generate particles from solutions, solids, mixtures or the like (e.g., spray drying, grinding, ball milling, extrusion, prilling, etc.). Each method of attempting to manufacture particles is often dependent upon the properties of the composition of the particles and the degree of uniformity desired in the particles. Each of these processes has its strengths and weaknesses, and all processes form a distribution of particles sizes, with the extent of the distribution correspondingly affecting the performance of the final product. It is not always feasible or desirable to attempt to form a uniform batch of particle sizes by filtering the particles according to their size. Many particles are brittle or malleable and the process will alter the original size distribution, usually tending to make the mean or number average size of the collection of particles smaller. This is not necessarily a desirable effect.

Spray dryers for the industrial scale production of solid particulate materials from liquid formulations are well known and typically comprise a tower into which the liquid formulation is sprayed by an atomizer, with hot gas being introduced into the tower for contact with the spray. Various forms of atomizers are in common use, such as two-fluid pneumatic nozzles for small drops, single-fluid nozzles and high-speed rotary disc atomizers. However, industrial scale spray dryers do not readily lend themselves to applications in which the size of the particles can be accurately controlled, particularly in applications requiring narrow size distributions with an SMD (Sauter Mean Diameter) less than 1 mm, and especially less than 500 microns. Also, existing industrial scale spray dryers tend to produce substantial quantities of fine particles that are entrained by, and have to be subsequently separated from, the gas used to effect drying. Separation equipment for the purpose of gas clean-up constitutes a significant capital cost in building a spray drier plant.

It is known from Berglund and Liu (Environmental Science & Technology, Vol. 7, No. 2, February 1973, Pages 146–153) to generate aerosols comprising closely monodisperse particle sizes. Droplets are formed from a single liquid jet by feeding liquid under pressure through a single orifice in a disc and mechanically disturbing the disc at a constant frequency by means of an electrically driven piezoelectrical ceramic so that the jet breaks up into uniform droplets. The droplets so formed are then passed through a further orifice together with a turbulent air jet that serves to disperse the stream of droplets into a conical shape. The resulting aerosol is diluted and transported by an air flow passing through a vertical plastic tube and the air may also serve to dry the droplets when the latter comprise a non-volatile solute in a volatile solvent by evaporating the solvent. The aerosol generator disclosed in the Berglund and Liu reference is intended to produce monodisperse aerosols for use in aerosol research, calibration of aerosol sampling and measurement instruments, testing particulate control devices such as cyclones, filters and scrubbers, and for studying the effects of particulate air pollutants. The use of a sonic device to induce cyclic disturbances on the surfaces of liquid jets formed by a multiple orifice nozzle for the production of a monodisperse spray is disclosed in an article by L F Bouse in Transactions of the ASAE—1975, Pages 618–622. It has been proposed to combine these types of aerosol particle controls on certain particle manufacturing systems in the hope that more uniform aerosol particles will produce more uniform dried solids, but this method is only partially effective, as it does not account for aerial particle interaction, agglomeration, and melding before cooling or drying.

GB-A-1454597 discloses a method of prilling a liquid in which a liquid is passed under pressure through a flat perforated plate and is subjected to periodic pressure fluctuations in the direction of flow. The perforations are shown as being oriented at different angles relative to one another for reasons that are not disclosed. The resulting liquid droplets solidify to form grains having average diameters of the order of 1200 microns or greater.

EP-A-86704 discloses a process for the production of perfectly spherical and porous granules by dispensing liquid droplets from a plurality of needles. The liquid droplets fall on to a moving bed of powdered material, the droplet size and shape being controlled by producing a laminar air flow concentric with each droplet-forming needle so that the droplets emitted individually from each needle is skimmed by the laminar air flow. Thus, the air flow actually determines and effects the size of the particles that are provided, and does not separate particles of diverse sizes into groups of uniform sizes.

U.S. Pat. No. 5,910,558 (Schoenherr, et al.) describes that micropowder may also contain mixtures of primary components A and B. In addition to the essential components, the micropowders may also contain, for example, up to 40% by weight of further additives, such as flameproofing agents, colorants or stabilizers. Where the components to be used in spray-drying comprise polyarylene ether sulfones or polyarylene ether ketones, spray drying is carried out by atomizing the melts or solutions into a gas which is inert under the process conditions, such as air or nitrogen. The polyarylene ether sulfones or polyarylene ether ketones are preferably dissolved in a solvent before being sprayed. Suitable solvents are dipolar aprotic liquids. The suitable solvents include N-substituted amides, sulfoxides and sulfones. Examples are N,N-dimethylformamide, N,N-dimethylacetamide, N-methylpyrrolidone, dimethyl sulfone, tetramethylene sulfone (sulfolane) and diphenyl sulfone. Among these, N-methylpyrrolidone, dimethyl sulfoxide and dimethylformamide are particularly preferred. Diphenyl sulfone, ditolyl sulfone and trifluoroacetic acid are especially suitable solvents for particularly sparingly soluble polyarylene ether ketones. Either the atomization temperature can be chosen so that the melt or the solution has the viscosity suitable for atomization or the solids content of the solution can be chosen so that the solution has the suitable viscosity at a certain atomization temperature, the latter being preferred. The reduced viscosity of the solution at the atomization temperature is up to 8000 mPa·s. It may also be higher, for example 10,000 mPa·s. In general, solutions having higher viscosities are difficult to atomize. The reduced viscosities are preferably 1000, particularly preferably from 5 to 500, in particular from 10 to 100, mPa·s. In general, solutions that are at room temperature are atomized. To reduce their viscosity, it may be necessary to spray the solutions at elevated temperatures, for example at from 50 to 100° C. As a rule, however, the atomization temperatures are below the boiling point of the particular solvent. Pneumatic atomizers, such as multimaterial nozzles, in particular two-material nozzles, may be used for atomization. Examples of these are double-flow or triple-flow two-material nozzles. In order to generate angular momentum or flow deflection, the two-material nozzles may contain baffles. These may be mounted both on the gas side and on the liquid side. It is also possible to use ultrasonic atomizers. The ratio of mass throughput of atomizing gas to mass throughput of liquid is in general greater than 2, particularly advantageously from 3 to 10. As a rule, gas pressures of 5 bar or more are required. A gas pressure of more than 100 barr is rarely necessary. In general, the gas pressures are from 10 to 70 barr. After the atomization, the liquid droplets can be dried in a drying chamber. The solvent can be evaporated either at atmospheric pressure or at reduced pressure. The heat required for evaporating the solvent is preferably supplied at the top of the tower by means of an inert drying gas. A particularly suitable drying gas is nitrogen. However, other gases inert to the composition of the particles or at least the exterior composition of the particle, such as carbon dioxide or air, may also be used. The gas temperature at the top of the drying tower is preferably greater than the evaporation temperature of the solvent and may be from room temperature to 500° C. In general, it is at 100° C. or more, preferably from 200 to 300° C.

The drying gas preferably flows together with the liquid droplets through the drying tower and is sucked off at the outlet of the tower together with the dry material. The gas temperature at the outlet of the tower depends on the desired residual solvent content of the powder. It may be from room temperature to slightly less than the gas temperature at the top of the drying tower. As a rule, it is 50° C. or more, for example from 120 to 170° C. In general, temperatures greater than 200° C. are not required. The powder can in general be separated from the gas stream in a conventional manner by filters or cyclones. Filters for separating off solids are preferably used for the preparation of the novel micropowders. The residual solvent content of the resulting micropowder without subsequent drying is in general not more than 5%, in particular less than 2%. In order further to reduce the residual solvent content, the spray drying may be followed by a subsequent drying procedure, which can be combined with subsequent cooling. The subsequent drying may be carried out, for example, in a fluidized bed.

In the spray drying process, it is possible to use spray systems concomitantly. Examples of spray systems are fine-particle inorganic materials, such as silica, hydrophobic silica or alumina, and in particular polytetrafluoroethylene. The spray systems are used, as a rule, in amounts of from 0.1 to 20, in particular from 1 to 5, % by weight, based on polyarylene ether sulfone or polyarylene ether ketone, calculated as 100% strength.

U.S. Pat. No. 5,897,876 (Rudnic, et al.) describes drugs incorporated into microemulsions by admixture using conventional mixing devices and homogenizers used for semisolid ointments and lotions, with agitation at speeds common to emulsified products such as creams and emulsions. Examples of common equipment employed are propeller or turbine mixers, homogenizers, colloid mills, ultrasonic mixers and microfluidizers. The shear of the agitation should be sufficient to form a stable dispersion, but not too great to cause degradation of the drug. The shear forces will form aggregates that have diameters ranging from 100–500 angstroms. Mixers can also be employed with suitable vacuum to prevent formation of bubbles. Monitoring and evaluation of pH, viscosity, specific gravity and aggregate sizes are necessary. Using these devices, the mixture of drug in the hydrophobic material (in the oil-in-water embodiment) is formed into particles, e.g. beads or spheres, by spray-congealing or "prilling". This process uses a spray nozzle that atomizes the material in a cooling tower or chamber. As the material is sprayed, surface tension causes a uniform spherical bead to be formed. As the bead falls through the cooling chamber, it hardens into a stable, intact sphere. The particles generally have a particle size of from 0.5 microns to 100 microns. It is preferred to reduce the size of the sphere as much as possible, most preferably to a mean or size average particle diameter of below 10 microns. Optionally, the particles are coated with a sustained-release coating and/or an enteric coating to modify the rate of drug release from the particles.

U.S. Pat. No. 5,766,521 (Le Thiesse, et al.) describes a process suitable for shaping, in particular, organic products used in the pharmaceutical and agrochemical fields. The pearls obtained according to the invention have physico-chemical characteristics which are intrinsic to them. The pearls obtained have a size of particles essentially in spherical form, having a diameter that may be chosen, by means of the process of the invention, from within a wide range. Thus, the particle size expressed by the median diameter (d50) may range between 100 micrometers and 3,000 micrometers but is preferably between 500 micrometers and 2,000 micrometers. The median diameter is defined as being such that 50% by weight of the particles have a diameter above or below the median diameter. The sizes are determined by passage through metal sieves. Depending on the starting material and its field of application, the chosen particle size may be more or less coarse. Thus, in the case of glyceryl guaiacolate that constitutes a preferred application of the process of the invention, the median diameter is preferably between 500 micrometers and 1,000 micrometers.

U.S. Pat. No. 5,693,342 (Cervos, et al.) describes a process, coumarin and/or a derivative thereof is melted, then the molten mass is extruded through a nozzle to form droplets. The droplets are solidified by permitting them to fall by gravity in a tower against a countercurrent of cold gas, and the spherules obtained are next recovered. The process of the invention is suited for the preparation of coumarin spherules/beads and it is equally applicable to the derivatives of coumarin, provided they have a melting point of from 50° C. to 200° C., preferably from 50° C. to 100° C.

U.S. Pat. No. 5,628,937 (Oliver, et al.) describes a process for the production of solid particles, comprising: projecting from a body of liquid an array of mutually divergent jets; disturbing the jets to cause break up thereof into streams of droplets of narrow size distribution; contacting the array of resulting droplet streams with a gas flow which has a magnitude exceeding the magnitude of the velocity at which the jets are projected to reduce coalescence of the droplets in each stream; and causing or allowing the droplets to solidify at least partially while in flight. That invention seeks to provide an improved process for the production of solid particles with a controlled narrow size distribution, particularly industrial scale production of solid particles with narrow particle size ranges with a Sauter Mean Diameter substantially less than 1 mm, e.g., no greater than 800 micron and, in some instances, less than 500 micron. According to that invention, there is provided a process for the production of solid particles, comprising:

projecting from a body of liquid an array of mutually divergent jets; disturbing the jets to cause break up thereof into streams of droplets of narrow size distribution;

contacting the array of resulting droplet streams with a gas flow to reduce coalescence of the droplets in each stream; and causing or allowing the droplets to solidify at least partially while in flight. Preferably the gas flow is turbulent and is contacted with the droplet streams so as impart variable displacement forces to the droplets laterally of the direction of jet projection. Alternatively or additionally, the gas flow may be arranged to impart an acceleration to the droplets in the general direction of travel of the array of jets.

It is asserted in Oliver to be possible to produce relatively large droplets (typically with a mean diameter of 2000 microns) with a narrow droplet size distribution by controlling break up of the liquid jets. When substantially smaller droplets (for example, less than about 500 microns) are required, the spread of droplet sizes increases significantly. This was attributable to the fact that, whilst small droplets can be initially produced with a narrow size range by techniques involving controlled disturbance of liquid jets, subsequent coalescence of droplets derived from each jet takes place which affects the initial narrow size distribution significantly. Such coalescence tends to take place when the droplet size is such that successive droplets in the stream tend to close up and coalesce due to a reduction in drag force on droplets in streams (i.e., slip streaming). In practical terms, there is a significant restriction on the volumes of materials that can be produced by this process because of its complexity. The production person tends to push the volume and sacrifices the size distribution. Again, however, this is a process designed to create particles with a reduced size distribution among the product particles, but is not designed nor capable of separating particles within the reduced size distribution into groups of particles wherein each group has a narrow size distribution. The gas flow is employed in the process of that invention to reduce coalescence, thereby allowing the initial narrow droplet size distribution to be substantially maintained. Coalescence can be reduced by disrupting the droplet streams. This done by means of a turbulent gas flow and/or accelerating the droplets in each stream to overcome drag force-induced coalescence.

The Oliver patent additionally notes that conversion of the liquid droplets into powders may be effected in a variety of ways. A particularly convenient method involves making use of the gas used to entrain the droplets and maintain them separated in flight. Thus, for example, depending on the nature of the liquid formulation, the gas may be heated or cooled in order to transfer heat to, or extract heat from, the droplets. However, as mentioned previously other mechanisms for securing solidification (or partial solidification) are not excluded. The gas employed will usually be air although other gases are not excluded and may be necessary for example where it is necessary or desirable to prevent oxidation or where the gas effects solidification by means of chemical reaction with the droplets. Whichever mechanism is employed to effect solidification, the liquid droplets follow a trajectory under the influence of the gas flow and undergo at least partial solidification while in flight and eventually deposit as a powder in the hopper section. Powder can then be removed continuously or in a batch process.

U.S. Pat. No. 5,492,701 (Cervos, et al.) describes a process for the preparation of spherules of one or more alimentary or medicinal active principles in oily form, which process comprises:

in a first step, preparing an oil-in-water emulsion of:
one or more active principles in oily form suspended in water, the water optionally containing at least one protein;

in a second step, forming spherules by passing the oil-in-water emulsion through a nozzle;

in a third step, allowing the spherules formed to fall in a tower countercurrent to a flow of cold air either into at least one liquid crosslinking agent for a time sufficient to crosslink the spherules or into a solution, preferably aqueous, optionally containing a crosslinking agent, and optionally for a time sufficient to crosslink the spherules; and in a fourth step, recovering the spherules from said liquid crosslinking agent or said solution, said spherules optionally being crosslinked. The process is also optimized for the preparation of spherules of at least one of Vitamin A acetate and Vitamin E.

U.S. Pat. No. 5,354,520 (Oliver, et al.) describes a process for the manufacture of explosive grade ammonium nitrate (EGAN) prills comprising the steps of: a) continuously spraying a 95 to 98% by weight solution/melt of ammonium nitrate (or a mixture of ammonium nitrate and minor proportions of one or more other EGAN—acceptable nitrates) in/with water under spray-head conditions causing the emergent jets to break into cascades of substantially mono-sized droplets; b) allowing the formed droplets to fall within a vertical duct; c) continuously feeding a stream of cooling gas upwards through the duct to effect cooling and solidification of the falling droplets and some removal of moisture so as to form substantially mono-sized EGAN prills of up to about 4 mm diameter, and d) continuously withdrawing the EGAN prills collecting at the base of the duct (such EGAN prills then optionally being further cooled and/or dried in a forced draught regime), the process also involving intensification of the upward gas flow regime in the duct such that: (i) the temperature difference of the gas flow between its inlet to the duct and its outlet from the duct is at least about 60° C.; and (ii) the falling velocity of the prills in the duct is at most about 3 meters/second relative to ground (i.e. a stationary observer external to the duct) the upward gas flow velocity being e.g. 6 m/s relative to ground for 2 mm prill and 9 m/s for 3 mm prill and, optionally, (iii) recycling the gas stream after washing and cooling and addition of any required make-up gas.

U.S. Pat. No. 5,011,285 (Jorgensen, et al.) describes a method and apparatus for automatic analysis for determining the size distribution of particles and their deviation from a desired shape and color. The method includes the collection of particle samples and the generation of a particle curtain in a monolayer form. It is formed by taking particles through a silo whose distance (a) to a vibrating plate positioned below has a length relative to the distance (b) between the outer edge of the plate and the center line of the silo that is large enough for the particles flowing out of the silo and down onto the plate and out over its edge to form an angle (alpha) with the horizontal plane. The angle (alpha) is 50–90% of the sliding angle of the particulate material. The particle curtain is lit up and the silhouette of the particles therein is recorded and analyzed and presented in at least one place. The apparatus includes a sampler and a silo with at least one level sensor to record the level of particles in the silo and to give a signal to the sampler. The silo has a vertically displaceable extension at its outlet opening. The lower part of the extension is at a distance from a vibrating plate. The method of automatically analyzing a sample group of particles to determine the size distribution of the particles and their deviation from a desired shape, comprises the steps of: providing a container for particle samples, said container having an outlet for the particles, a vibrating plate having an outer edge positioned below said outlet a distance a, wherein the length between a center line of said outlet of said container and said outer edge of said vibrating plate is a distance b, said distances a and b being chosen such that the particles of the particle samples will flow from said outlet of said container onto said vibrating plate and over said outer edge in a monolayer when said plate vibrates, with an angle .alpha. of the surface of the particles on said vibrating plate relative to a horizontal plane at 50% to 90% of the sliding angle of the particles; placing particle samples in said container such that the particle samples flow through said container and onto said vibrating plate via said outlet;

vibrating said vibrating plate with the particle samples thereon so as to form a monolayer of said particles flowing over said outer edge of said vibrating plate;

lighting said monolayer;

pictorially recording said monolayer while said monolayer is lit to obtain a pictorial record of said monolayer; and analyzing said pictorial record of said monolayer to determine the size distribution of the particles therein.

U.S. Pat. No. 4,935,173 (Huey, et al.) describes a process for producing prills comprising:

(a) providing a housing with a top, bottom and side walls defining interiorly thereof a chamber;

(b) providing a bed support member disposed within the housing and dividing the chamber into a fluidizing zone thereabove and fluidizing gas plenum therebeneath; the chamber including a spraying zone above the fluidizing zone;

(c) providing a spray means including an elongated tubular header with a plurality of orifices therein;

(d) passing a cooling fluidizing gas into the fluidizing gas plenum to pass through the bed support member into the fluidizing zone to fluidize a bed of prills formed in the chamber such that the prills are agitated sufficiently to prevent agglomeration of the prills;

(e) spraying a spray stream of molten material through the spray means into the chamber in the spraying zone above the fluidizing zone at an upward angle such that individual streams from the plurality of orifices do not contact each other or internal surfaces of the chamber, the spray means disposed near at least one side wall of the chamber such that the spray is diverted into the cooling fluidizing gas passing from the fluidizing zone through the spraying zone and such that spray droplets formed fall toward the fluidized bed of the chamber for a sufficient time to form prills upon contact with the fluidized bed;

(f) removing the fluidizing gas passing through the spraying zone; and (g) removing the prills from the fluidized bed.

U.S. Pat. No. 4,793,783 (Huey, et al.) describes a prilling apparatus comprising:

(a) a housing with a top, bottom and side walls and defining interiorly thereof a chamber, (b) a bed support member disposed within the housing and dividing the chamber into a fluidizing zone thereabove and fluidizing gas plenum therebeneath, (c) the chamber including a spraying zone above the fluidizing zone, (d) a fluidized bed of prills superadjacent to the bed support member, (e) a means for supplying a cooling fluidizing gas into the fluidizing gas plenum to pass through the bed support member into the fluidizing zone to fluidize the bed of prills, (f) a spray header assembly disposed in the chamber for spraying a stream of molten material into the chamber in the spraying zone above the fluidizing zone at an angle such that the individual streams first travel in a generally upwardly direction and then in a generally downwardly direction in the chamber and the streams are not contacting each other or the internal surfaces of the chamber, the spray header assembly disposed near at least one side wall of the chamber such that the spray is diverted into the cooling fluidizing gas passing from the fluidizing zone through the spraying zone and such that the spray droplets formed fall toward the fluidized bed of the chamber for a sufficient time to form prills upon contact with the fluidized bed, the spray header assembly including an elongated tubular header member with a flat surface along the longitudinal length of the tubular header member and a plurality of orifices disposed on the flat surface of the tubular header member along the longitudinal length of the tubular header member, (g) a means for removing the fluidizing gas passing through the spraying zone, and (h) a means for removing the prills from the fluidized bed.

U.S. Pat. No. 4,424,072 (Lerner) describes a method of operating a prilling tower producing prills of one of the class of materials consisting of ammonium nitrate and urea, the said method including injecting a spray of a melt of said material at a first position of said tower, introducing a stream of air at second position of said tower displaced from said first position, conducting the spray in counterflow relationship to said air to cool said spray and to produce prills, and removing said prills from said tower, the said method being characterized by that the spray is maintained in an atmosphere of gaseous ammonia as it enters the tower to suppress the emission of fumes from the tower.

U.S. Pat. No. 4,031,174 (Bennett) describes a process for prilling molten materials, e.g., molten sulfur and molten fertilizer materials, in which molten droplets are prilled down a prilling tower into a countercurrent gas stream which carries drops of a volatilizable material which volatilizes on contact with the molten material and removes heat from the molten material so as to form solid skinned droplets. The solid-skinned droplets are collected, e.g. from a fluidized bed in the base of the prilling tower.

U.S. Pat. No. 4,002,706 (Pretorius) discloses wax powders of improved hardness and/or free-flowing properties produced from blends containing a high content (e.g., 20–80%) of soft wax and a harder or higher melting wax component. The molten blend is sprayed and chilled in the form of droplets predominantly between 0.2 and 1 mm in diameter, to solidify rapidly while in suspension. The harder, higher melting components selectively solidify in the outermost region of the particles. The wax powder so obtained is superior to powders obtained by casting the blend into blocks, followed by milling. Typical powders are useful for candle extrusion and chipboard manufacture and as internal and external lubricants for plastics, e.g., polyvinylchloride.

The process for producing the particulate wax composition comprises:

a) preparing a melt essentially composed of a substantial content of low melting point, soft wax having a congealing point between about 20° C. and 80° C. and a penetration greater than 80 measured at 25° C., $10^{-1}$ mm, and another wax superior thereto in respect of at least one of the properties: melting point and hardness;

b) converting the melt into droplets, having a size corresponding to the particle size of the particulate wax composition being produced;

c) suspending the droplets in a cooling medium;

d) whilst thus suspended, over a period of between about 7 and 20 seconds, causing said droplets to solidify progressively from the outside inwardly by the chilling action of the cooling medium; and e) collecting as said particulate wax composition a free flowing powdered product consisting of the said droplets in externally solidified form, the wax superior in respect of melting point and/or hardness being concentrated in the outer region of the droplets.

U.S. Pat. No. 5,782,951 (Aylen, et al.) describes a problem with particles produced by most particulating processes, including prilling. High friability is a significant restraint to the use of prilled and granular urea products. Upon physical impact, the prills or granules tend to break into smaller particles, and to produce substantial amounts of dust while being handled, transported, and applied to the intended soil environment. Particle hardness and nonfriability are important for two reasons. Firstly, urea products are often used in bulk blend fertilizer products. In those products, it is important that there be a predetermined, closely-sized range of granules to avoid unwanted segregation of the component products. If the urea product breaks into smaller particles, segregation of the urea is likely to occur. The second reason why particle hardness and nonfriability are important is to prevent the break down of prilled or granular urea products when introduced into the modern, rotating turbine-fan type field distribution equipment commonly used today. The breakdown of the granules or prills results in uneven distribution of the fertilizer from such equipment. These urea products are often shattered to such a degree that the smaller pieces fall in a shorter trajectory from the equipment and thus form a more narrow and a more concentrated swath on the soil surface than is intended and desired. The rapid dispensing of fully manufactured particles from the application equipment is clearly identified as a problem.

U.S. Pat. No. 4,885,021 (Elrod) similarly notes that even if the granules hold together during such subsequent storage and transportation and thereby lend themselves to favorable consideration relative to maintenance of satisfactory particle size distribution for the preparation of non-segregable bulk blends infra, their introduction into modern, rotating turbine-fan type field distribution equipment introduces the added, unwanted consideration of breakage therein and subsequent uneven distribution therefrom. For instance, urea particles which have not been properly treated for exhibiting improved hardness characteristics are oftentimes shattered to an appreciable degree when they are introduced into most common types of equipment, with the result that the small pieces resulting therefrom fall in a shorter trajectory from the distributor and thusly form a more narrow and a more concentrated swath on the soil surface than is originally intended.

This fact is also identically reported in U.S. Pat. No. 4,587,358 (Blouin) wherein is stated for instance, urea particles which have not been properly treated for exhibiting improved hardness characteristics are oftentimes shattered to an appreciable degree when they are introduced into most common types of equipment with the result that the small pieces resulting therefrom fall in a shorter trajectory from the distributor and thus form a more narrow and a more concentrated swath on the soil surface than is originally intended.

U.S. Pat. No. 4,675,140 (Sparks, et al.) noted that, with particles that failed to be coated in a process, altering greatly the size of the two distinct types of particles, that there was a difference in location distance from a spinning support. Thirty-eight grams of paraffin wax (Fisher P-22), 38 grams of Polywax-500 (made by the Bareco Division of Petrolite Inc.), and 24 grams of Elvax 420 (DuPont) were melted and mixed in a beaker. The molten wax and 38 grams of potassium chloride particles were mixed in the heated mixing reservoir. With all the heat guns on, the disc was then turned on to rotate at 700 rpm. The valve was opened to allow the suspension to flow onto the center of the disc from which it was dispersed. Coated potassium chloride was thrown in an upward trajectory (because of the angle of the disc with respect to horizontal) landing at floor level roughly six feet away from the disc. The smaller pure wax particles followed a path much closer to the disc, separated by one or two feet from the coated potassium chloride particles.

Particle sizing can also be done in many different ways. The two primary ways of determining the size and size distribution of particles is by filtering techniques (with different size filters separating out and collecting the particles, with volumes or numbers then counted or weighed) of by direct observational techniques (e.g., microscopic examination and statistical analysis of samples).

Even with these varieties of processes for manufacturing and determining the size of particle products, there is still a need for more efficient processes for the described manufacturing and property objectives, either alone or together.

SUMMARY OF THE INVENTION

Particles (either preformed, collected and inserted into the processing of the invention, or manufactured and continuously dried/cooled in the process of the invention) are separated by a process in which drag forces that are differentially dependent upon the size of the particles are used to separate the particles by altering their trajectories (herein referred to as a "trajectory separation process"). The process will be primarily discussed in correlation with a manufacturing process in which particles may need to be dried or cooled, but the process is equally useful with collections or batches of particles that have been manufactured earlier and transported to the trajectory separation process apparatus. An air cannon, or air hose or other liquid hose or liquid propelling system could be used as the projectile system of the invention where the particles are preformed.

In one embodiment of the present invention, particles are cooled and sized or sized after earlier, independent manufacture by projecting the particles into or through a medium with sufficient drag against the particles to cause particles of different sizes to continue along different trajectories. By placing dividers or containers in different trajectory paths (usually at the bottom or along a horizontal distance with respect to the trajectory), the differential drag against the different size particles separates them into different size groupings, each of which sizes are collected by the different containers or are separated by the different dividers. Rather than using increased flow of air or gas to more rapidly cool or dry droplets, a relatively quiescent medium is used, with possibly a longer trajectory path, to sufficiently cool or dry the particles and more efficiently separate the particles by their different size groups.

BRIEF DESCRIPTION OF THE FIGURES

FIG. 1 shows an idealized view of the projection and separation of particles by a method according to the present invention.

FIG. 2 shows a droplet and tracking particles formed during atomization.

DETAILED DESCRIPTION OF THE INVENTION

The general process of the invention comprises a process for separating particles of different sizes comprising:

projecting a stream of particles (preferably having a range of average sizes or number average particle diameters, especially with a range of deviation from the number average diameter of at least ±25%) into a fluid medium;

allowing the particles to develop differing trajectories in the fluid medium (the differing trajectories probably developing because of differences in relative particle sizes with a relatively consistent average particle density, or with similar average particle sizes and different densities, or with combinations of different sizes and different densities);

providing at least two separate collection areas for collecting particles of different average size particles from the stream of particles, the different trajectories directing particles towards different separate collection areas; and collecting particles along the different trajectories.

The process may have, for example, the stream of particles that comprises preformed solid particles that are projected into said fluid medium. Liquid particles also may be projected into the fluid medium. The liquid particles may be molten, solidifiable (e.g., polymerizable, crosslinkable, etc.) or dryable in the fluid (gaseous or liquid) medium and are dried, cooled or otherwise solidified to solid or gel particles after projection into the fluid medium. The process even may provide the fluid medium with a vector component that is negative with respect to the stream of particles (the direction of the particles as they are emitted or projected is against the flow of the fluid medium) when the particles are projected into the fluid medium.

The fluid component may have, for example, a vector that is between 0 and −180 degrees, preferably between −1 and −45 degrees with respect to the stream of particles when it is projected into the fluid medium, that is, slightly negatively angled against the initial projectile direction of the particles (although it is also possible to have a slight positive angling, propelling the particles slightly by movement of the fluid medium, which would extend the trajectory and make the collection paths longer). The fluid medium preferably comprises a gas that is inert with regard to chemical reactivity of the particles. The inert gas, for example, comprises a gas selected from the group consisting of carbon dioxide, nitrogen, fluorocarbons and hydrocarbons. Inert liquid are also useful, particularly with larger size particles (e.g., at least 1 mm) and with higher density particles (e.g., specific gravities greater than 1.2).

The present invention makes use of natural drag forces of a shape-retaining composition moving through a fluid medium to separate particles projected through the medium. The particles may be solid when first introduced into the fluid medium or may be a liquid that hardens or solidifies (dries, freezes, polymerizes, cures, hardens, thickens, or the like) within the fluid medium. When introduced into the fluid medium, the particles (or droplets if a liquid) must not be so readily soluble within the medium that the average particle or droplet will exhibit significant (e.g., it must be less than 10% of total weight) dissolution or weight loss (except by drying upon removal of a solvent) when moving through the medium along its trajectory, e.g., within twenty seconds immersion in the fluid medium. It is more efficient if the particles or droplets are relatively insoluble in the medium, with the particles or droplets displaying a weight loss of less than 1% by weight, or less than 0.5% by weight when resting (in a static mode at room temperature and standard pressure) within the medium for one minute at the temperature at which the fluid medium is used in the process (assumed to be room temperature and pressure, that is standard temperature and pressure). Lower solubility rates are always tolerable, and if the solubility of the particle significantly decreases with its hardening while it is cooled, some leeway in its solubility at the higher end may also be tolerated.

The trajectory of a particle in a medium may be affected by a number of different factors. In a non-buoyant medium, the main factors that determine the trajectory are initial velocity vectors, a gravity vector, relative density between the particles and the medium, and a drag vector. The actual flight or movement of a particle in a non-buoyant medium may actually have a more complex makeup of components (as fluid particles or droplets will undergo deformation that varies with the speed of the droplet and the density of the medium), but for a general enablement and understanding of the invention, an understanding of the first order vector components will be sufficient.

FIG. 1 shows an idealized set of paths for particle flow through a drag medium as a function of particle size. A single outlet particle or droplet source 2 projects or propels a stream of particles or droplets 4 into a drag medium (not shown). As the particles (not shown individually within stream 4) move farther away from the droplet source 2, drag forces and gravity (in this non-buoyant format) start altering the trajectory 6 of the particles. Smaller particles are fairly rapidly slowed to a rate that alters their trajectory into a path 8 that rapidly decays into a relatively freefall path 10. Slightly larger particles are less rapidly affected by drag forces, but still drop out of the main trajectory path 6 earlier than larger particles, forming a larger particle trajectory 12 which also decays into its own relatively free fall path 14. Progressively larger particles form progressively longer trajectory paths 16, 18 and 20, with the largest particles traveling along the longest trajectory path 20. As these trajectory paths 8, 12, 16, 18 and 20 are dependent upon primarily the particle size, the medium and the initial trajectory 6 vectors being the same, the particles are naturally segregated along the trajectory paths generally in accordance with their size. Each trajectory path tends to have a uniform particle size within each path. A collection bin 30 may be placed at the bottom of the trajectory paths 8, 12, 16, 18 and 20, with separate chambers A B C D E F G H I J and K (with dividers between them) capturing different size distributions of particles. Each chamber will have its own average size of particles, increasing distance positions from the source 2 along the trajectory path 6 providing for increased size particles. The size of the chambers does not have to be equal, and for efficiency in collecting particle sizes, some combinations of differing size chambers would be desirable. For example, where a specific size range of particles is desired, it does not matter how many chambers are available short of the trajectory path for that size range, or how many chambers there are available after the trajectory path for that size range. Therefore if it is calculated that the appropriate size range for particles will land in chambers E F and G only, then chambers A B C and D may be a single chamber. Similarly, chambers H I J and K may be a single chamber. Likewise, E F and G may be combined into a single chamber and the shortfall or long fall may be multiple or single chambers.

The operation of the system has been described for a non-buoyancy system, that is, a system in which the particles do not experience significant buoyancy in the medium. Variations from this system are clearly possible. Those variations would include a system where the particles have a higher density than the medium, but the densities are sufficiently close that the medium exhibits a buoyancy effect upon the particles sufficient to alter the trajectory path. For example, looking gain at FIG. 1, with a vacuum or low density air medium, a specific composition and size of particle will exhibit a trajectory path 8. If the density of the medium were increased slightly, but significantly, the trajectory for that same size and density of particle would be altered to trajectory 12 by the buoyancy effect, effectively countering gravity slightly. With each progressive increase in density of the medium (in a static environment), the trajectory would tend to extend farther out, progressing to trajectory 16, then 18 and then 20. The particles cannot be the same density as the medium, as they would neither sink nor rise, and there would be no vertical vector component to alter their flight path. On the other hand, if the medium were considerably more dense than the density of the particles, a mirror image collection system and trajectories would exist. Drag on the particles would slow the smaller particles earlier along a light path or initial vector trajectory 6, so that particles that followed trajectory path 12 in a non-buoyancy system, would now follow path 24 in a buoyancy system. A collector (not shown) would segregate particles as they rose into chambers (not shown). In effect, buoyancy has negated the trajectory altering effect of gravity and replaced it with a vector altering buoyancy effect.

The operation of the system has been described with respect to a static system, wherein the medium is assumed to remain still, and the particles move through the medium, with drag, initial velocity vectors, and gravity affecting the trajectory. It is also possible, within controlled limits, to reduce the size of the trajectory paths with a draft-drag system, in which the medium has a vector that is at least partially opposed (by partially opposed, it is meant that the vector is not ant parallel to the initial trajectory vectors (4), but rather at an angle between 1 and 179 degrees to that initial vector. Looking again at FIG. 1, a draft vector (slowly moving medium) 40 is shown which would oppose X vectors (horizontal vectors) in the initial trajectory 6. With cautious use of medium flow against the X vector of the initial trajectory, the trajectory for each size particle can be altered. Each particle would drop into a free fall earlier in time and distance than the same particles would in a static system, the effective X vector (vis-à-vis the medium) having decreased. The flow of the medium in this manner should be relatively slow, as too great a flow rate would merely push all the particles back in a more random pattern, destroying the differentiating ability of the system. Additionally, the flow should be non-pulsed, as pulses would later the trajectories in an episodic, pulsed manner, reducing the ability of the system to provide narrow size range distributions. Non-pulsed pressure in fluids can be achieved by numerous types of commercially available pumping or pressure systems, such as magnetic compression systems, water head systems, and other systems that do not directly depend on pulsed pressure to create a pressure on the fluid flowing through the system.

The discussion has focused upon the general background and underlying science in the performance of the process, and now will address the more specific fields within which the process may be practiced and the materials with which the process may be performed. There are at least two generic areas within which the present invention finds particular utility. One field is in the practice of particle sizing. Where particles have been pre-made in any type of particle making process, the determination of the size distribution of the particles may be easily effected by using a variant of the process of the present invention. The process may also be used to generate batches or continuous supplies of uniform sized particles, while reducing waste from non-uniform particles produced during the process.

Particle sizing can be readily performed according to a practice of the present invention. Looking at FIG. 1, it can be seen that with a source of pre-made particle being projected along trajectory 6, the particles will separate into different size distributions, be colleted according to those distributions, and then may be weighed to determine the weight percentage of particles within each size grouping. This would be an extremely rapid method of performing what has heretofore been an extremely labor intensive task or which requires expensive equipment (e.g., particle counters) that provide no significantly greater likelihood of better statistical results. This sizing process also results in a product of the size measurement that can be used for a commercial product after counting. The only real technical concerns in this process have been addressed above, but a few important issues shall be reiterated here. To assure that an accurate count is obtained, the particles should not be readily soluble in the drag medium into which the particles are projected. For example, carbon dioxide, nitrogen, fluorocarbons, hydrocarbons, mixtures thereof and the like, under various pressure levels and temperatures to alter the density of the drag medium, are appropriate gaseous media for selecting the drag medium. The projection system should not project such a large volume of particles at any time that a continuous stream of particles is created, which would prevent any drag effects from occurring. The particles should be emitted with at least about 10%, at least about 25%, at least about 50%, or at least about 75% of the volume of the stream comprising open space or fluid within the stream. The spacing between particles should be adjusted to assure as much individual particle surface contact with the medium as possible as the particles move through the medium. This spacing can be accomplished, for example, by generating a large medium/particle volume ratio (as in a fluidized bed) and then projecting the gas/particle stream into the medium. The temperature of the medium should be below the melting point of the composition of the particles, so that the particles will remain or become solids and not readily coalesce.

The process of the present invention is also an efficient way of providing particles by essentially conventional particle forming processes and combining a sizing step with the manufacturing process. The use of prilling processes or spray drying processes will be used in the description, but it is apparent to those of ordinary skill in the art that any particle manufacturing process can be used in combination with the improvements described in the process of the present invention. As noted above, these processes generally operate by the projection of moisture laden, curable, hardenable or molten materials into a cooling environment so that the sprayed droplets cool, dry or otherwise solidify into particles, which are then collected. The pre-made particles may be projected into opposing cooling streams, supported in cooling fluidized beds, sprayed into a different state material (e.g., into a cooling liquid), and the like, even where the particles may be sprayed against and collected on a solid surface. There is in that initial manufacturing process, however, no attempt to coordinate the trajectories of different particle sizes and collect them according to distributions imposed by drag forces against the particles.

Looking again at FIG. 1, the ability of the process to both form and size the particles can be readily appreciated. The process actually can be seen to be almost ideally suited for this aspect of the invention. Small particles, with less mass to them, travel shorter paths, such as the shortest path 26 shown in FIG. 1. Small particles moving along this path will be dried or cooled to solidity fairly rapidly. Larger particles with greater mass require more cooling time or more drying time, which would be provided by traveling along the longer path 28 for the larger particles. Therefore, he particles are inherently subjected to a cooling or drying path most appropriate for the mass and size of the respective particles as a natural outcome of the process. It would be desirable, where drying is effected in the process, to have the air within the drying environment 32 replaced with drier air or air with reduced amounts of any solvent that is being removed, so that drying efficiency is not altered. Therefore, the mass medium movement 40 can provide an additional controlled function by replacing or exchanging the medium to maintain appropriate solvent content (lower content or minimum content) or to maintain a cooling temperature in the drying or cooling zone 32.

The materials that can be used as the particulates are essentially unlimited, with the selection of an appropriate non-solvating drag medium. Preformed solid particles could be magnetic materials, semiconductor materials, dielectrics, pharmaceuticals, conductors, pigments, polymers, reflective materials, optical beads, and the like and may comprise such diverse materials as polymers, minerals, inorganic oxides, organic materials, waxes, resins, blends, composites, metals, solid esters of oils, thermoplastics, crosslinked materials, natural resins, synthetic resins, and the like.

There are some natural phenomena that occur during certain practices of the invention that should be understood, to better appreciate limitations in the practice of the invention. As shown in FIG. 2, a source 100 of molten particles 106, 108 and 114 is shown. At an exit 102 from the source 100, the particle 106 necks 104 at the exit 102 because of physical forces, including surface tension. After the particle 106 has left the source 100, it appears as particle 108, with small droplets 112 formed by the retraction of part of the droplet into the central mass of the droplet 108. A deformation 110 of the droplet 108 may also exist because of the physical forces involved. This type of deformation 110 and more frontal deformations or flattening 120 of the particles 108 may occur because of drag or resistance forces. As the particles progress along their trajectory, more spherical particles 114 form, still carrying insignificant mass of fine particles 116 in their wake. These fine particles 114 may actually travel along the complete trajectory with the spherical particles 114 because of wakes behind the larger particles 114. The mass of these smaller particles is relatively insignificant to the total mass of the larger particles, and these ultrafine particles can usually be easily separated from the larger particles by a simple washing or flocculation step. The mass of these ultrafines, as compared to the larger particles that are formed (even the relatively small particles to be collected), is quite small. Even with the small particles, the mass ratio of the ultrafines to the small particles may well be less than about 5%, and with the larger particles, the mass ration of ultrafines to particles may be less than 1%, less than 0.8%, less than 0.5%, less than 0.2% or even less. With slower projection of liquid particles, and therefore less energy present in the snap-back in the leaving droplets, these lower percentages may be achieved for the entire mass of droplets with the total mass ratio of ultrafines/droplets being in these low ranges. However, as previously noted, these ultrafines can be easily removed by inexpensive, physical processes. In fact, the use of negative flow in the fluid medium can carry the ultrafine particles completely out of the trajectory flow so that they may be captured behind the particle emitting region. These and other aspects of the invention are apparent and will be further described in the following, non-limiting example.

EXAMPLE 1

Jojoba wax ester particles made according to the teachings of U.S. Pat. No. 5,968,530 (these materials forming an independent invention that is not proprietary to the assignee of the present invention) were prepared. The size distribution of particles were measured when manufactured (without separation), when mesh screen separated, and when measured according to the practice of the present invention. The separation and measurement of particle distribution was done according to the present invention by spraying droplets of heated jojoba ester through a single opening (500 micron) nozzle at 0.05 barr over atmospheric pressure into an air chamber (the jojoba oil being only mildly oxidizable at ambient conditions in air, but not changing shape during reaction) at 40° F.(~4.5° C.) at an angle of nozzle elevation of 45°. Nine different containers were provided underneath the trajectory of the beads, with 0.1 m (along the direction of the flight path) by 0.5 m (perpendicular to the flight path) dimensions. The heated jojoba ester liquid cooled in the fluid air medium, and the trajectory of the individual beads was observed to be altered by the drag on the individual particles. The comparison of the three sets of data are shown below, with the objective being to provide particles in the range of 500 to 600 micrometer average diameter.

| Size of beads (microns) | Unscreened Beads (number percent, No. %) | Screened Beads (number percent, No. %) | Trajectory Sized Beads (No. %) |
|---|---|---|---|
| >850 | 0.5 | 0.0 | 0.0 |
| 710–810 | 2.4 | 0.0 | 0.0 |
| 600–710 | 5.4 | TRACE | 0.1 |
| 500–600 | 13.2 | 14.8 | 95.4 |
| 425–500 | 15.7 | 23.4 | 3.6 |
| 355–425 | 17.0 | 24.5 | 0.2 |
| 250–355 | 26.8 | 36.3 | 0.5 |
| 150–250 | 15.4 | 1.0 | 0.0 |
| <150 | 3.8 | TRACE | 0.0 |

As can be seen from this data, a much narrower size range of particles can be obtained. Another interesting note is that conventional screening clearly alters the size of the particles by the physical forces that occur during screening, where particles may be shoved together to agglomerate or meld, or particles are sliced by screen mesh.

What is claimed is:

1. A process for separating particles of the same material comprising particles of different sizes comprising:
    projecting in a first direction a stream of particles into a fluid medium, the first direction of the particles as they are projected being against a direction of flow of the fluid medium;
    allowing said particles to develop differing trajectories in said fluid medium;
    providing at least two separate collection areas for different average size particles from said stream of particles;
    smaller particles moving smaller distances to a near collection area and moving larger particles moving longer distances to a farther collection area of the at least two collection areas; and
    collecting particles along said different trajectories in said at least two separate collection areas;
wherein said fluid medium has a vector component that is negative with respect to the stream of particles when projected into the fluid medium and the fluid component has a vector that is between −1 and −45 degrees with respect to the stream of particles when it is projected into the fluid medium.

2. The process of claim 1 wherein said stream of particles comprises solid particles that are projected into said fluid medium.

3. The process of claim 1 wherein liquid particles are projected into said fluid medium.

4. The process of claim 3 wherein said liquid particles are initially molten and are cooled to solid particles after projection into said fluid medium.

5. The process of claim 3 wherein said particles comprise initially liquid particles that are dried into solid particles after projection into said fluid medium.

6. The process of claim 1 wherein the fluid medium comprises a gas that is inert with regard to chemical reactivity of the particles.

7. The process of claim 6 wherein the inert gas comprises a gas selected from the group consisting of carbon dioxide, nitrogen, fluorocarbons and hydrocarbons.

8. The process of claim 1 wherein the particles are projected with at least about 10% of the volume of the stream comprises open space or fluid within the stream.

9. The process of claim 1 wherein the particles are selected from the group consisting of magnetic materials, semiconductor materials, dielectrics, conductors, pigments, polymers, reflective materials and optical beads.

10. The process of claim 1 wherein the particles are selected from the group consisting of polymers, minerals, inorganic oxides, organic materials, waxes, resins, blends, composites, metals, solid esters of oils, natural resins and synthetic resins.

* * * * *